United States Patent
Feidt

[11] Patent Number: 6,047,842
[45] Date of Patent: Apr. 11, 2000

[54] BUCKET DEVICE

[76] Inventor: Bernard J. Feidt, 15924 Darvey Ave., Faribault, Minn. 55021

[21] Appl. No.: 09/061,210
[22] Filed: Apr. 16, 1998
[51] Int. Cl.[7] .................................................. B65D 21/00
[52] U.S. Cl. .......................... 220/23.88; 220/528; 206/510
[58] Field of Search ............................... 220/23.99, 729, 220/737, 908, 909, 528, 630, 23.88; 206/510

[56] References Cited

U.S. PATENT DOCUMENTS

| | | | |
|---|---|---|---|
| 3,981,099 | 9/1976 | Dziewulski | 220/630 X |
| 4,834,253 | 5/1989 | Crine | 220/909 X |
| 5,086,917 | 2/1992 | Dziersk et al. | 206/510 X |
| 5,295,606 | 3/1994 | Karwoski | 220/908 X |
| 5,392,901 | 2/1995 | Kuray | 220/528 X |
| 5,547,098 | 8/1996 | Jordan | 220/528 X |

*Primary Examiner*—Steven Pollard

[57] ABSTRACT

A new bucket device for storing and organizing items. The inventive device includes a bucket with a plurality of stackable storage trays disposed in the interior space of the bucket. The bottom of the bucket is inserted into a hole in the top face of a support base which has ground engaging members extending from its bottom face. A lid substantially covers the top opening of the bucket.

12 Claims, 2 Drawing Sheets

BUCKET DEVICE

BACKGROUND OF THE INVENTION

1. Field of the Invention

The present invention relates to containers and more particularly pertains to a new bucket device for storing and organizing items.

2. Description of the Prior Art

The use of containers is known in the prior art. More specifically, containers heretofore devised and utilized are known to consist basically of familiar, expected and obvious structural configurations, notwithstanding the myriad of designs encompassed by the crowded prior art which have been developed for the fulfillment of countless objectives and requirements.

Known prior art containers include U. S. Pat. No. 5,429,265; U.S. Pat. No. 4,911,295; U.S. Pat. No. Des. 248,610; U.S. Pat. No. 4,295,680; U.S. Pat. No. 5,375,347; and U.S. Pat. No. 5,433,463.

While these devices fulfill their respective, particular objectives and requirements, the aforementioned patents do not disclose a new bucket device. The inventive device includes a bucket with a plurality of stackable storage trays disposed in the interior space of the bucket. The bottom of the bucket is inserted into a hole in the top face of a support base which has ground engaging members extending from its bottom face. A lid substantially covers the top opening of the bucket.

In these respects, the bucket device according to the present invention substantially departs from the conventional concepts and designs of the prior art, and in so doing provides an apparatus primarily developed for the purpose of storing and organizing items.

SUMMARY OF THE INVENTION

In view of the foregoing disadvantages inherent in the known types of containers now present in the prior art, the present invention provides a new bucket device construction wherein the same can be utilized for storing and organizing items.

The general purpose of the present invention, which will be described subsequently in greater detail, is to provide a new bucket device apparatus and method which has many of the advantages of the containers mentioned heretofore and many novel features that result in a new bucket device which is not anticipated, rendered obvious, suggested, or even implied by any of the prior art containers, either alone or in any combination thereof.

To attain this, the present invention generally comprises a bucket with a plurality of stackable storage trays disposed in the interior space of the bucket. The bottom of the bucket is inserted into a hole in the top face of a support base which has ground engaging members extending from its bottom face. A lid substantially covers the top opening of the bucket.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new bucket device apparatus and method which has many of the advantages of the containers mentioned heretofore and many novel features that result in a new bucket device which is not anticipated, rendered obvious, suggested, or even implied by any of the prior art containers, either alone or in any combination thereof.

It is another object of the present invention to provide a new bucket device which may be easily and efficiently manufactured and marketed.

It is a further object of the present invention to provide a new bucket device which is of a durable and reliable construction.

An even further object of the present invention is to provide a new bucket device which is susceptible of a low cost of manufacture with regard to both materials and labor, and which accordingly is then susceptible of low prices of sale to the consuming public, thereby making such bucket device economically available to the buying public.

Still yet another object of the present invention is to provide a new bucket device which provides in the apparatuses and methods of the prior art some of the advantages thereof, while simultaneously overcoming some of the disadvantages normally associated therewith.

Still another object of the present invention is to provide a new bucket device for storing and organizing items.

Yet another object of the present invention is to provide a new bucket device which includes a bucket with a plurality of stackable storage trays disposed in the interior space of the bucket. The bottom of the bucket is inserted into a hole in the top face of a support base which has ground engaging members extending from its bottom face. A lid substantially covers the top opening of the bucket.

Still yet another object of the present invention is to provide a new bucket device that has stackable trays for allowing easy organization of items therein.

Even still another object of the present invention is to provide a new bucket device that has wheels so that it can be easily rolled around.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
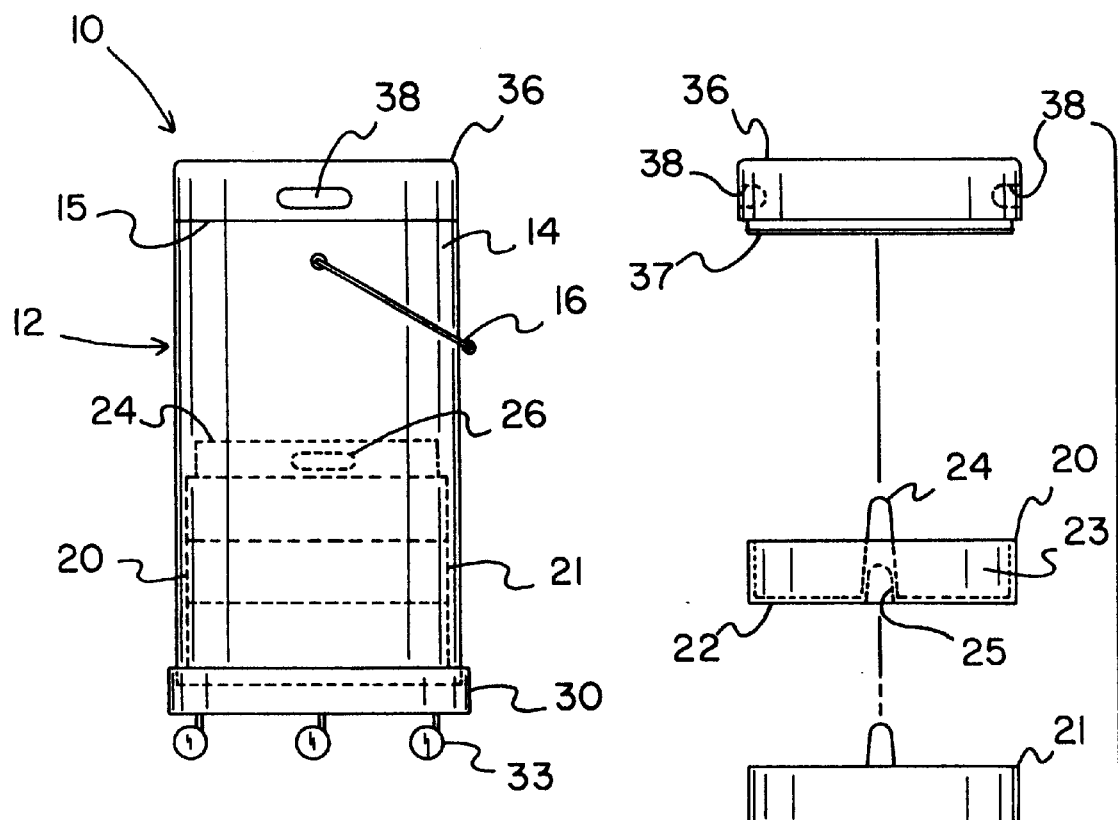
FIG. 1 is a schematic side view of a new bucket device according to the present invention.
Figure 2:
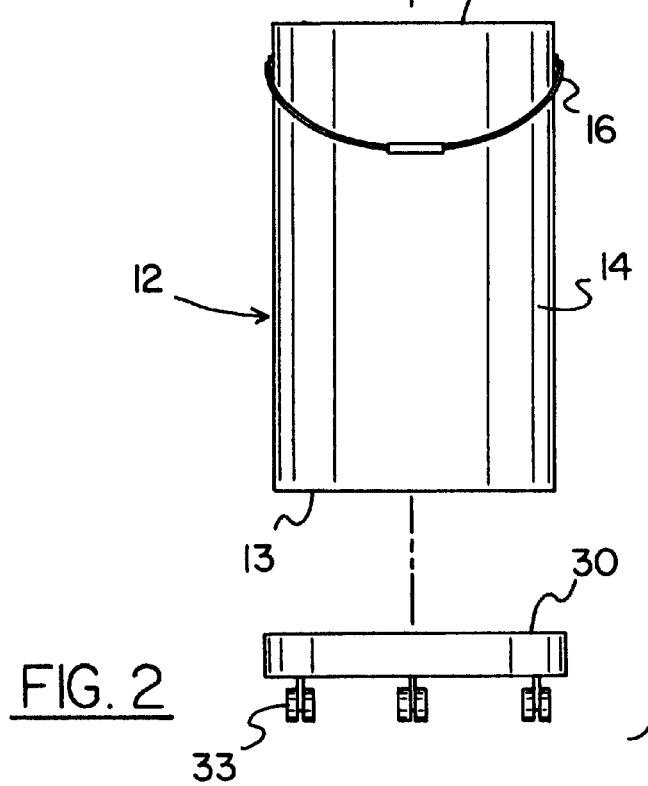
FIG. 2 is a schematic exploded side view of the present invention.
Figure 3:
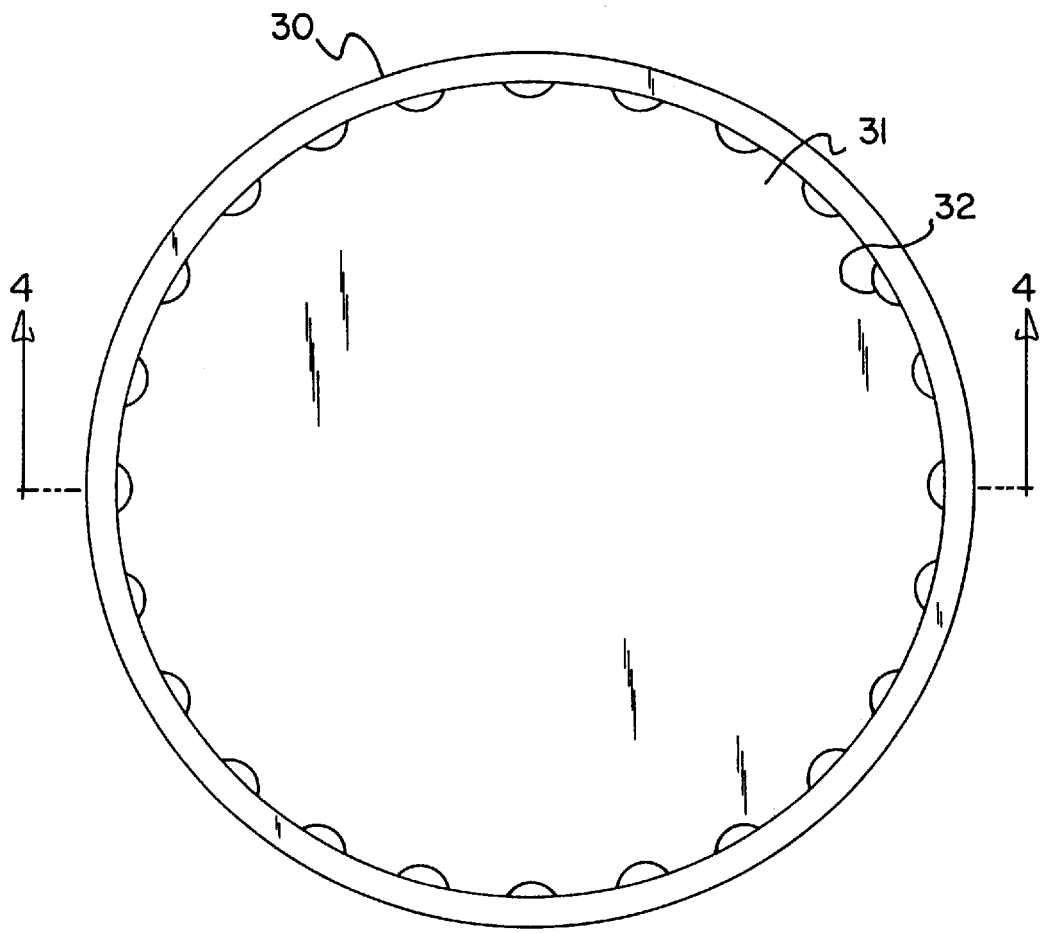
FIG. 3 is a schematic top side view of the top face of the support base of the present invention.
Figure 4:
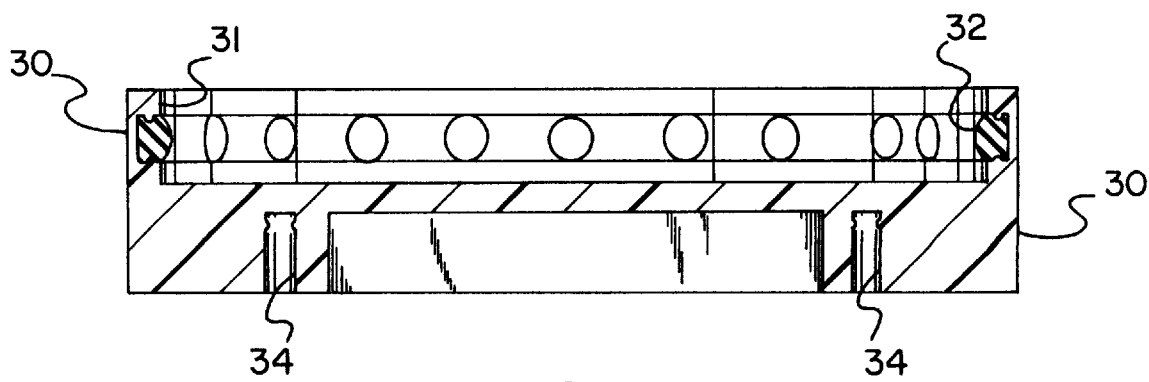
FIG. 4 is a schematic cross-sectional view of the support base of the present invention taken from line 4—4 on FIG. 3.

With reference now to the drawings, and in particular to FIGS. 1 through 4 thereof, a new bucket device embodying the principles and concepts of the present invention and generally designated by the reference numeral 10 will be described.

As best illustrated in FIGS. 1 through 4, the bucket device 10 generally comprises a bucket 12 with a plurality of stackable storage trays 20,21 disposed in the interior space of the bucket 12. The bottom 13 of the bucket 12 is inserted into a hole 31 in the top face of a support base 30 which has ground engaging members 33 extending from its bottom face. A lid 36 substantially covers the top opening of the bucket 12.

In closer detail, the bucket 12, such as a five gallon bucket 12, is generally cylindrical and has a bottom 13 and a perimeter side wall 14 defining an interior space. The perimeter side wall 14 of the bucket 12 has an upper edge 15 defining a top opening into the interior space of the bucket 12. The bucket 12 has a carrying handle 16 pivotally coupled to the perimeter side wall 14 of the bucket 12 which is designed for carrying the bucket 12. The carrying handle 16 is positioned towards the upper edge 15 of the perimeter side wall 14 of the bucket 12.

A plurality of stackable storage trays 20,21 are disposed in the interior space of the bucket 12. Each of the storage tray 20,21 has a tray base 22 and a perimeter rim wall 23 upwardly extending around the tray base 22. The tray base 22 of the storage tray is generally circular and has upper and lower surfaces. The perimeter rim wall 23 is upwardly extended from the upper surface of the tray base 22 of the storage tray. The lower surface of the tray base 22 of the storage tray is designed for resting on the perimeter rim wall 23 of another storage tray beneath it. The tray base 22 of the also has a lifting handle 24 upwardly extending from upper surface of the tray base 22 of the storage tray with the length of the lifting handle 24 preferably extending across the diameter of the tray base 22. Ideally, the lifting handle 24 has a finger opening 26 for extending a user's fingers through to grasp the lifting handle 24 when lifting. The lifting handle 24 defines a recess 25 in the lower surface of the tray base 22 of the storage tray. The recess 25 is designed for receiving the lifting handle 24 of another storage tray on which the storage tray is rested on.

The support base 30 is generally disc-shaped and has circular top and bottom faces. The top face of the support base 30 has a hole 31 with a generally circular periphery. The bottom 13 of the bucket 12 is removably inserted into the hole 31 of the top face of the support base 30. Preferably, the support base 30 has a plurality of holding fingers 32 radially extending inwards from the periphery of the hole 31 of the top face of the support base 30 into the hole 31 of the top face of the support base 30. The holding fingers 32 are designed for abutting against the perimeter side wall 14 of the bucket 12 for holding the bucket 12 in the hole 31 of the top face of the support base 30. Ideally, the holding fingers 32 comprise a resiliently compressible material, such as rubber. The bottom face of the support base 30 has ground engaging members extending therefrom. Ideally, the ground engaging members comprise caster wheels 33 which are detachably attached to the support base 30 by insertion into bores 34 in its bottom face.

The lid 36 substantially covers the top opening of the bucket 12. The lid 36 is generally disc shaped and has a top and a bottom and a perimeter side between the top and bottom of the lid 36. The top of the lid 36 is adapted for permitting the sitting of a user thereon. The bottom of the lid 36 has an annular lip 27 which is inserted into the top opening of the bucket 12 such that the bottom of the lid 36 rests on the upper edge 15 of the perimeter side wall 14 of the bucket 12. The perimeter side of the lid 36 preferably has a pair of diametrically opposed finger slots 38 designed for aiding lifting the lid 36 off of the bucket 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A container device, comprising:

a bucket having a bottom and a perimeter side wall defining an interior space, said perimeter side wall of said bucket having an upper edge defining a top opening into said interior space of said bucket;

a lid substantially covering said top opening of said bucket: and a plurality of storage trays being disposed in a stack of storage trays in said interior space of said bucket, wherein each of said storage trays comprises:

a tray base and a perimeter rim wall extending around said tray base of said storage tray, the perimeter rim wall having an upper edge;

a support base having top and bottom faces;

said top face of said support base having a hole, said bottom of said bucket being inserted into said hole of said top face of said support base;

said bottom face of said support base having ground engaging members extending therefrom;

wherein said tray base of each of said storage trays further includes upper and lower surfaces, said lower surface of said tray base of said storage tray being for resting on the perimeter rim wall of another storage tray therebeneath; and wherein said tray base of each of said storage trays further includes a lifting handle extending upwardly from said upper surface of said tray base of said storage tray and extending above a plane defined by the upper edge of the perimeter rim wall, the upward extension of said lifting handle forming a recess in said lower surface of said tray base of said storage tray, said recess having a pair of opposed side walls and a pair of opposed end walls, said recess of an upper one of said storage trays in said stack of storage trays receiving a protruding portion of the lifting handle of a lower one of said storage trays in said stack of said storage trays to permit the upper storage tray to rest on the upper edge of the perimeter rim wall of the lower storage tray.

2. The container device of claim 1, wherein said bucket is generally cylindrical, said tray base of said storage tray is generally circular, said support base is generally disc-shaped, and said lid is generally disc shaped.

3. The container device of claim 1, wherein said bucket has a carrying handle pivotally coupled to said perimeter side wall of said bucket, said carrying handle being positioned towards said upper edge of said perimeter side wall of said bucket.

4. The container device of claim 1, wherein said hole of said top face of said support base has a periphery, and wherein said support base has a plurality of holding fingers radially extending inwards from said periphery of said hole of said top face of said support base into said hole of said top face of said support base.

5. The container device of claim 4, wherein said holding fingers comprise a resiliently compressible material.

6. The container device of claim 5, wherein said holding fingers comprise rubber.

7. The container device of claim 1, wherein said ground engaging members comprise wheels.

8. The container device of claim 1, wherein said lid has a top and a bottom and a perimeter side between said top and bottom of said lid, said bottom of said lid resting on said upper edge of said perimeter side wall of said bucket.

9. The container device of claim 8, wherein said bottom of said lid has an annular lip, said annular lip being inserted into said top opening of said bucket such that said bottom of said lid rests on said upper edge of said perimeter side wall of said bucket.

10. The container device of claim 8, wherein said perimeter side of said lid has a pair of finger slots.

11. A container device, comprising:

a bucket being generally cylindrical and having a bottom and a perimeter side wall defining an interior space, said perimeter side wall of said bucket having an upper edge defining a top opening into said interior space of said bucket;

said bucket having a carrying handle pivotally coupled to said perimeter side wall of said bucket, said carrying handle being positioned towards said upper edge of said perimeter side wall of said bucket;

a plurality of storage trays being disposed in a stack of storage trays in said interior space of said bucket, wherein each of said storage trays comprises:

a tray base and a perimeter rim wall extending around said tray base of said storage tray, the perimeter rim wall having an upper edge;

said tray base of said storage tray being generally circular and having upper and lower surfaces, said lower surface of said tray base of said storage tray being for resting on the perimeter rim wall of another storage tray therebeneath;

said tray base having a lifting handle extending upwardly from said upper surface of said tray base of said storage tray and extending above a plane defined by the upper edge of the perimeter rim wall, the upward extension of said lifting handle forming a recess in said lower surface of said tray base of said storage tray, said recess of an upper one of said storage trays in said stack of storage trays receiving a protruding portion of the lifting handle of a lower one of said storage trays in said stack of said storage trays to permit the upper storage tray to rest on the upper edge of the perimeter rim wall of tile lower storage tray;

a support base being generally disc-shaped and having top and bottom faces;

said top face of said support base having a hole having a generally circular periphery, said bottom of said bucket being inserted into said hole of said top face of said support base;

said support base having a plurality of holding fingers radially extending inwards from said periphery of said hole of said top face of said support base into said hole of said top face of said support base, wherein said holding fingers comprise a resiliently compressible material, wherein said holding fingers comprise rubber;

said bottom face of said support base having ground engaging members extending therefrom, wherein said ground engaging members comprise wheels, said wheels being detachably attached to said support base;

a lid substantially covering said top opening of said bucket, said lid being generally disc shaped and having a top and a bottom and a perimeter side between said top and bottom of said lid;

said bottom of said lid having an annular lip, said annular lip being inserted into said top opening of said bucket such that said bottom of said lid rests on said upper edge of said perimeter side wall of said bucket; and said perimeter side of said lid having a pair of finger slots.

12. A container device, comprising:

a bucket being generally cylindrical and having a bottom and a perimeter side wall defining an interior space, said perimeter side wall of said bucket having an upper edge defining a top opening into said interior space of said bucket;

said bucket having a carrying handle pivotally coupled to said perimeter side wall of said bucket, said carrying handle being positioned towards said upper edge of said perimeter side wall of said bucket;

a plurality of storage trays being disposed in a stack of storage trays in said interior space of said bucket, wherein each of said storage trays comprises:

a tray base and a perimeter rim wall extending around said tray base of said storage tray, the perimeter rim wall having an upper edge;

said tray base of said storage tray being generally circular and having upper and lower surfaces, said lower surface of said tray base of said storage tray being for resting on the perimeter rim wall of another storage tray therebeneath;

said tray base having a lifting handle extending upwardly from said upper surface of said tray base of said storage tray and extending above a plane defined by the upper edge of the perimeter rim wall, the upward extension of said lifting handle forming a recess in said lower surface of said tray base of said storage tray, said recess having a pair of opposed side walls and a pair of opposed end walls, said recess of an upper one of said storage trays in said stack of storage trays receiving a protruding portion of the lifting handle of a lower one of said storage trays in said stack of said storage trays to permit the upper storage tray to rest on the upper edge of the perimeter rim wall of the lower storage tray;

a support base being generally disc-shaped and having top and bottom faces;

said top face of said support base having a hole having a generally circular periphery, said bottom of said bucket being inserted into said hole of said top face of said support base;

said support base having a plurality of holding fingers radially extending inwards from said periphery of said hole of said top face of said support base into said hole of said top face of said support base, wherein said holding fingers comprise a resiliently compressible material, wherein said holding fingers comprise rubber;

said bottom face of said support base having ground engaging members extending therefrom, wherein said ground engaging members comprise wheels, said wheels being detachably attached to said support base;

a lid substantially covering said top opening of said bucket, said lid being generally disc shaped and having a top and a bottom and a perimeter side between said top and bottom of said lid;

said bottom of said lid having an annular lip, said annular lip being inserted into said top opening of said bucket such that said bottom of said lid rests on said upper edge of said perimeter side wall of said bucket; and said perimeter side of said lid having a pair of finger slots.

* * * * *